(No Model.)

C. W. & R. B. ROBISON.
VEHICLE SEAT.

No. 380,663.        Patented Apr. 3, 1888.

Witnesses.
F. L. Gill.
N. B. Corwin.

Inventors.
Charles W. Robison
Robert B. Robison
by W. Bakewell & Sons
Their Attorneys.

UNITED STATES PATENT OFFICE.

CHARLES W. ROBISON AND ROBERT B. ROBISON, OF ALLEGHENY CITY, PENNSYLVANIA.

VEHICLE-SEAT.

SPECIFICATION forming part of Letters Patent No. 380,663, dated April 3, 1888.

Application filed October 26, 1887. Serial No. 253,440. (No model.)

*To all whom it may concern:*

Be it known that we, CHARLES W. ROBISON and ROBERT B. ROBISON, of Allegheny City, in the county of Allegheny and State of Pennsylvania, have invented a new and useful Improvement in Vehicle-Seats; and we do hereby declare the following to be a full, clear, and exact description thereof, reference being had to the accompanying drawings, forming part of this specification, in which—

Figure 1:
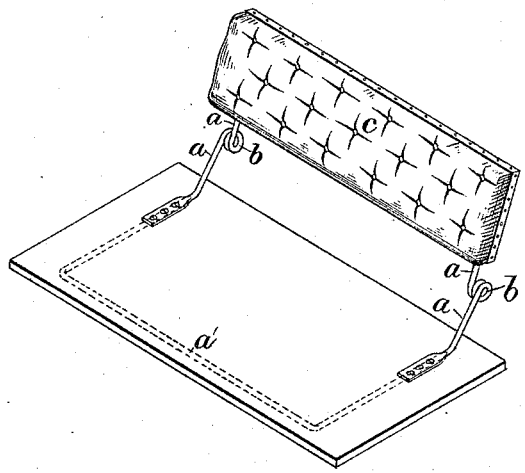
Figure 2:
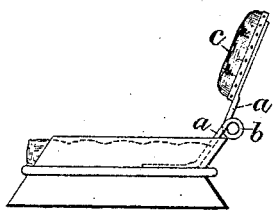

Figure 1 is a perspective view of our improved vehicle-seat, and Fig. 2 is a side view thereof.

Like letters of reference indicate like parts wherever they occur.

In the drawings, *a* represents the frame of the back of the seat, which frame is formed of one or more steel rods, the lower portion of which is secured, by screws or other suitable means, to the seat, and thence extends upward to form the back. At a short distance above the seat a spiral coil, *b*, is formed in the rod or rods—one on each side—which coil is made by bending the rods when heated, after which they are tempered, and thereby two strong spiral springs are formed, which are situate between the seat and the top of the back, so that the upper portion of the back will yield to pressure exerted against it, whereby a spring-back is formed.

In Fig. 1 of the drawings the frame is shown as formed from a single rod, *a'*, of steel; but we do not desire to limit ourselves to this form, as the side bars of the frame may be composed of separate rods *a*, as shown in Fig. 2, which are joined above the spiral springs *b* by the cross-bars or body of the seat-back *c*.

The advantages of our improvement are that a strong yielding back is formed, which is rigidly attached to the seat, and the yielding portion is situate above the level of the seat, so as to accommodate itself to the back.

We are aware that it is not new to provide the back of vehicle-seats with springs, so as to form a yielding back, and we do not desire to claim the same, broadly.

Although our improvement is designed, primarily, for vehicle-seats, it may be applied to seats for other purposes, such as chairs, &c.

We are aware that a coiled spring has been used to form a yielding back for dental and other chairs, and we do not desire to claim the same, broadly, as our improvement is not only designed to form a yielding back, but at the same time to compensate for the jarring movement of the vehicle.

What we claim, and desire to secure by Letters Patent, is—

As an improvement in seats for vehicles, a yielding back the frame-work of which is composed of bent metal rods having a bent spiral portion, so as to enable the back to accommodate itself to the movement of the vehicle, substantially as and for the purposes described.

In testimony whereof we have hereunto set our hands this 18th day of October, A. D. 1887.

CHARLES W. ROBISON.
ROBERT B. ROBISON.

Witnesses:
R. H. WHITTLESEY,
JAMES K. BAKEWELL.